(12) United States Patent
Banks, III (10) Patent No.: US 12,313,156 B1
(45) Date of Patent: May 27, 2025

(54) TRANSMISSION COOLING SYSTEM

(71) Applicant: Gale C. Banks, III, Azusa, CA (US)

(72) Inventor: Gale C. Banks, III, Azusa, CA (US)

( * ) Notice: Subject to any disclaimer, the term of this patent is extended or adjusted under 35 U.S.C. 154(b) by 0 days.

(21) Appl. No.: 18/927,550

(22) Filed: Oct. 25, 2024

(51) Int. Cl.
 *F16H 57/04* (2010.01)
 *F01M 11/00* (2006.01)

(52) U.S. Cl.
 CPC ..... *F16H 57/0416* (2013.01); *F01M 11/0004* (2013.01); *F16H 57/0452* (2013.01)

(58) Field of Classification Search
 CPC ............ F16H 57/0416; F16H 57/0452; F01M 11/0004; F01M 2011/0025
 See application file for complete search history.

(56) References Cited

U.S. PATENT DOCUMENTS

| | | | |
|---|---|---|---|
| 1,365,438 A * | 1/1921 | Adamson | F01M 11/065 220/675 |
| 1,653,427 A * | 12/1927 | Beebee | F01M 5/002 60/912 |
| 2,577,188 A * | 12/1951 | Hall | F01M 11/0004 184/104.2 |
| 3,482,642 A * | 12/1969 | Andrews | F16N 31/006 180/69.1 |
| 5,839,327 A | 11/1998 | Gage | |
| 5,927,384 A | 7/1999 | Waldner, Jr. | |
| 6,155,135 A | 12/2000 | Gage et al. | |
| 7,637,337 B2 | 12/2009 | Stranges | |
| 8,715,127 B2 | 5/2014 | Beutler et al. | |
| 10,443,705 B1 * | 10/2019 | Banks, III | F16H 48/38 |
| 10,859,150 B2 * | 12/2020 | Dahl | F16H 57/0416 |
| 2005/0126749 A1 | 6/2005 | Matti et al. | |
| 2008/0257625 A1 * | 10/2008 | Stranges | F16H 57/0412 180/69.1 |
| 2016/0305536 A1 * | 10/2016 | Weeter | F16K 1/16 |
| 2017/0051821 A1 | 2/2017 | Long et al. | |
| 2019/0154132 A1 * | 5/2019 | Dunham | B62D 21/03 |
| 2020/0208732 A1 * | 7/2020 | Rakuff | F16H 57/0417 |

* cited by examiner

Primary Examiner — Minh Truong
(74) Attorney, Agent, or Firm — Batt IP A Law Corporation; Richard Batt (57) ABSTRACT

A pan for a vehicle transmission having a transmission lubricant sump, the pan having a mounting periphery about the pan attachable to the transmission at a first side of the pan, the pan also having an area closing the transmission lubricant sump; inner cooling fins on the first side of the pan, the inner cooling fins configured for contact with lubricant in the lubricant sump; and outer cooling fins on a second side of the pan configured for contact with air, the outer cooling fins extending over the pan area closing the transmission lubricant sump; wherein at least some of the inner cooling fins and the outer cooling fins are aligned to optimize heat transfer from the inner cooling fins to the outer cooling fins.

20 Claims, 13 Drawing Sheets

TRANSMISSION COOLING SYSTEM

BACKGROUND

The field of the present invention is vehicle transmissions.

Vehicle transmissions frequently include a roughly cylindrically shaped case with a bottom lubricant pan bolted thereto. The lower portion of the case and the lubricant pan typically form a transmission and torque converter lubricant sump. Temperatures within the transmission may become elevated because of friction and fluid mixing effects to a level injurious to the included lubricant, bearings, gears, clutches, seals and the like. While vehicles may include transmission coolers utilizing air or water to try to help cool transmission lubricant, recent testing of vehicle transmissions under substantial sustained load suggests that transmission lubricant can reach temperatures sufficient to degrade lubricant performance and reduce transmission and lubricant life.

There exists a need for a system and method for cooling transmission lubricant that remedies the shortcomings of the prior art.

SUMMARY

The present invention is directed to vehicle transmission lubricant pans that help dissipate heat to prevent degradation of transmission lubricant performance.

Accordingly, in an implementation, a pan for a vehicle transmission having a transmission lubricant sump, has a mounting periphery about the pan attachable to the transmission at a first side of the pan, the pan including an area closing the transmission lubricant sump. The pan has inner cooling fins on the first side of the pan. The inner cooling fins are configured for contact with lubricant in the lubricant sump. The pan has outer cooling fins on a second side of the pan, the outer cooling fins extending over the pan area closing the transmission lubricant sump. The outer cooling fins are configured for contact with air. At least some of the inner cooling fins and the outer cooling fins are aligned to optimize heat transfer from the inner cooling fins to the outer cooling fins.

The vehicle transmission pan may have an air scoop including an upstream edge, a downstream edge and a connecting surface therebetween; wherein the upstream edge defines an opening facing toward a front of a vehicle. The opening may have a height of between about 1 inch and about 4 inches. The opening may have a height of between about 2.5 inches and about 3.5 inches. In an implementation, the air scoop is coupled to the transmission pan with a plurality of connectors; and wherein the scoop is configured to break away when subjected to a predetermined force to prevent damage to the transmission pan.

In an implementation, the transmission pan has a baffle pivotally mounted relative to the opening to selectively close the opening to removably block airflow through the scoop. The vehicle transmission pan may also have a baffle control system with a controller; a sensor coupled to the controller, the sensor being configured to measure at least one of ambient air temperature outwardly of the transmission pan and transmission lubricant temperature; and an actuator coupled to the pivotally mounted baffle and to the controller. The controller drives the actuator responsive to the measured temperature of the sensor. In an implementation, the controller is a binary thermostat. In an implementation, the controller is configured for modulated control of the actuator.

In an additional implementation, a vehicle transmission pan has: a cover plate; a mounting periphery about the cover plate attachable to a vehicle transmission at a first side of the cover plate, the cover plate including an area closing the transmission lubricant sump. The pan also has inner cooling fins on the first side of the cover plate, the inner cooling fins being configured for contact with lubricant in the lubricant sump. The pan also has outer cooling fins on a second side of the cover plate, the outer cooling fins extending over the cover plate area closing the transmission lubricant sump. The outer cooling fins are configured for contact with air. The pan also has an air scoop coupled to the cover plate, the air scoop extending over all or a portion of the outer cooling fins and configured to direct air to the outer cooling fins. Optionally, the inner cooling fins and the outer cooling fins are aligned to optimize heat transfer from the inner cooling fins to the outer cooling fins.

The air scoop may have an upstream edge, a downstream edge and a connecting surface therebetween; wherein the upstream edge defines an opening facing toward a front of a vehicle. The opening may have a height of between about 1 inch and about 4 inches. The opening may have a height of between about 2.5 inches and about 3.5 inches. The opening may extend across a width of the cover plate. Optionally, the air scoop is coupled to the cover plate with a plurality of connectors; and wherein the connectors are configured to break away when subjected to a predetermined force to prevent damage to the air scoop or the cover plate.

In an implementation, the transmission pan has a baffle pivotally mounted relative to the opening to selectively close the opening to removably block airflow through the scoop. The vehicle transmission pan may also have a baffle control system with a controller; a sensor coupled to the controller, the sensor being configured to measure at least one of ambient air temperature outwardly of the transmission pan and transmission lubricant temperature; and an actuator coupled to the pivotally mounted baffle and to the controller. The controller drives the actuator responsive to the measured temperature of the sensor. In an implementation, the controller is a binary thermostat. The controller may be configured for modulated control of the actuator.

Accordingly, it is a principal object of the present invention to provide improved thermal conditions for vehicle transmissions. Other and further objects and advantages will appear hereinafter.

BRIEF DESCRIPTION OF THE DRAWINGS

The features, aspects and advantages of the present invention will become better understood with regard to the following description, appended claims and accompanying figures wherein:

DETAILED DESCRIPTION

In the following description of the preferred implementations, reference is made to the accompanying drawings which show by way of illustration specific implementations in which the invention may be practiced. It is to be understood that other implementations may be utilized, and structural and functional changes may be made, without departing from the scope of this disclosure.

Turning in detail to FIGS. 1 to 13, a vehicle transmission 10 according to an implementation is illustrated. A vehicle transmission 10 has a case 12. A vehicle transmission pan 14 is placed in sealing engagement with the transmission case 12. Transmission lubricant partially fills the transmission case 12 and transmission pan 14. Therefore, the lower part of the case 12 and the pan 14 defines a lubricant sump. The transmission fluid is actively pumped from the sump throughout the transmission and torque converter to lubricate the transmission mechanism and the torque converter. Slipping action of clutches in the transmission and torque converter and fluid shear in the torque converter generates heat that needs to be dissipated. Bolts (not shown) engage the transmission pan 14 to the transmission case 12 to be sealably engaged for the containment of lubrication fluids and the exclusion of foreign matter.

The vehicle transmission pan 14 is shown to be an integral casting. In an implementation, the vehicle transmission pan 14 is made of aluminum. The components of this casting include a cover plate 16 which is dished to accommodate a transmission mechanism. The cover plate 16 includes an area closing the transmission lubricant sump located at the lower portion of the transmission case 12. A mounting periphery 18 extends fully about the cover plate 16 for scalable attachment to the transmission case 12. The mounting periphery has a sealing surface 20 for engaging with a mating surface on the transmission case 12. Mounting holes 22 extend through the mounting periphery 18 for engagement with the transmission case 12. The sealing surface 20 of the mounting periphery 18 can be seen in FIGS. 8 to 10. Typically, a gasket or other sealing means is accommodated between the sealing surface 20 and a mating surface on the transmission case 12.

Figure 8:
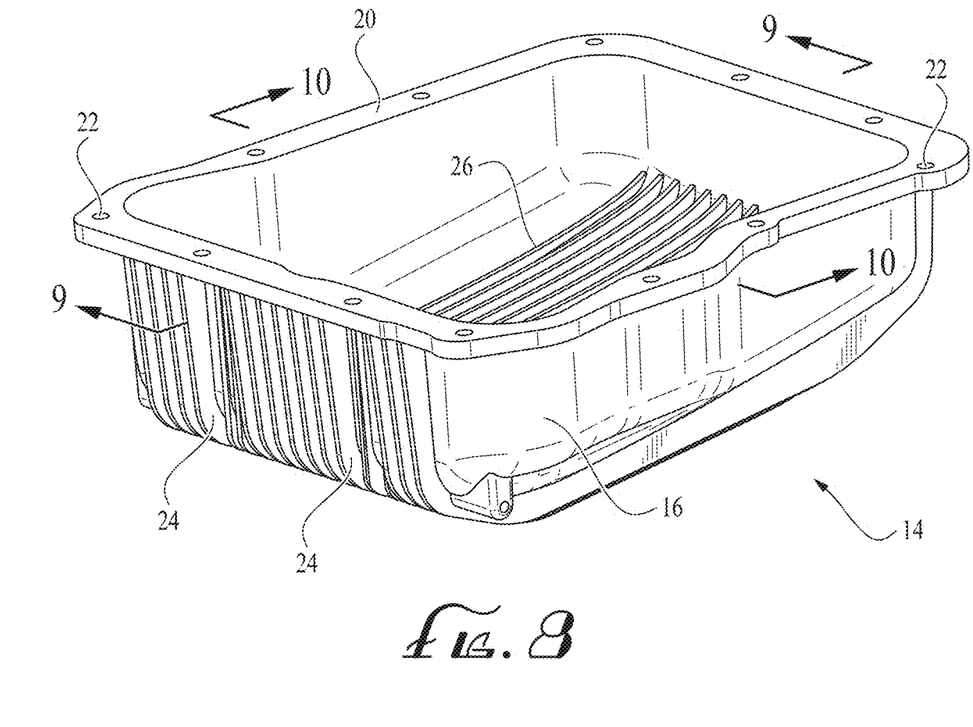
FIG. 8 is a top perspective view of a vehicle transmission pan according to an implementation.

The vehicle transmission pan 14 further includes outer cooling fins 24 integrally formed therewith. The outer cooling fins 24 are on the opposite side of the cover plate 16 from the sealing surface 20. As seen in FIG. 8, in a preferred implementation the arrangement of the outer cooling fins 24 is shown to be a parallel pattern of vertically-extending fins aligned with the direction of vehicle travel. This configuration allows for effective cooling and limited wind resistance. However, other configurations of fins may be desirable depending on, for example, airflow along a lower surface of a vehicle proximal to the transmission pan 14.

Figure 9:
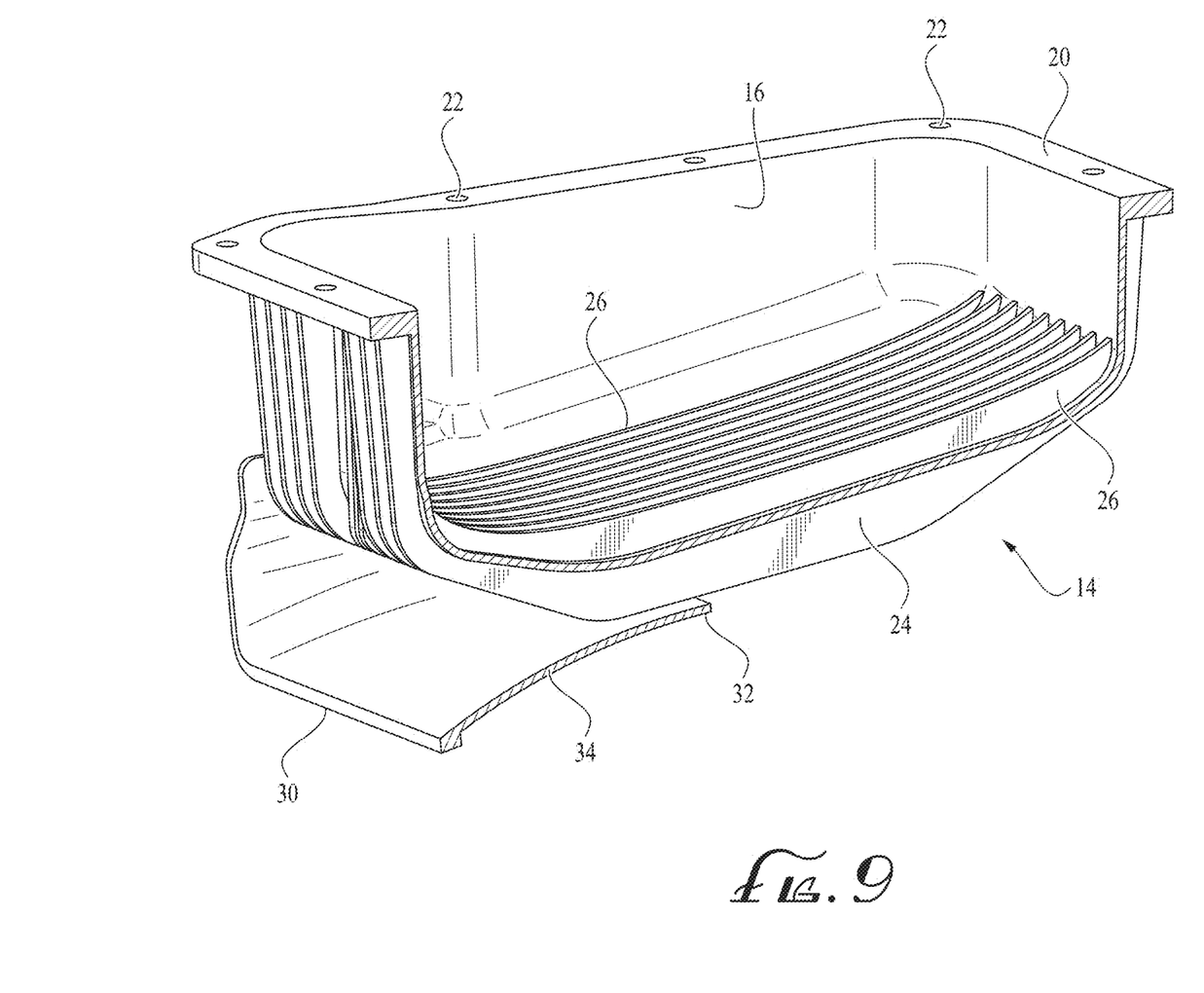
FIG. 9 is a top perspective section view of a vehicle transmission pan with a scoop taken along line 9-9 of FIG. 8.
Figure 10:
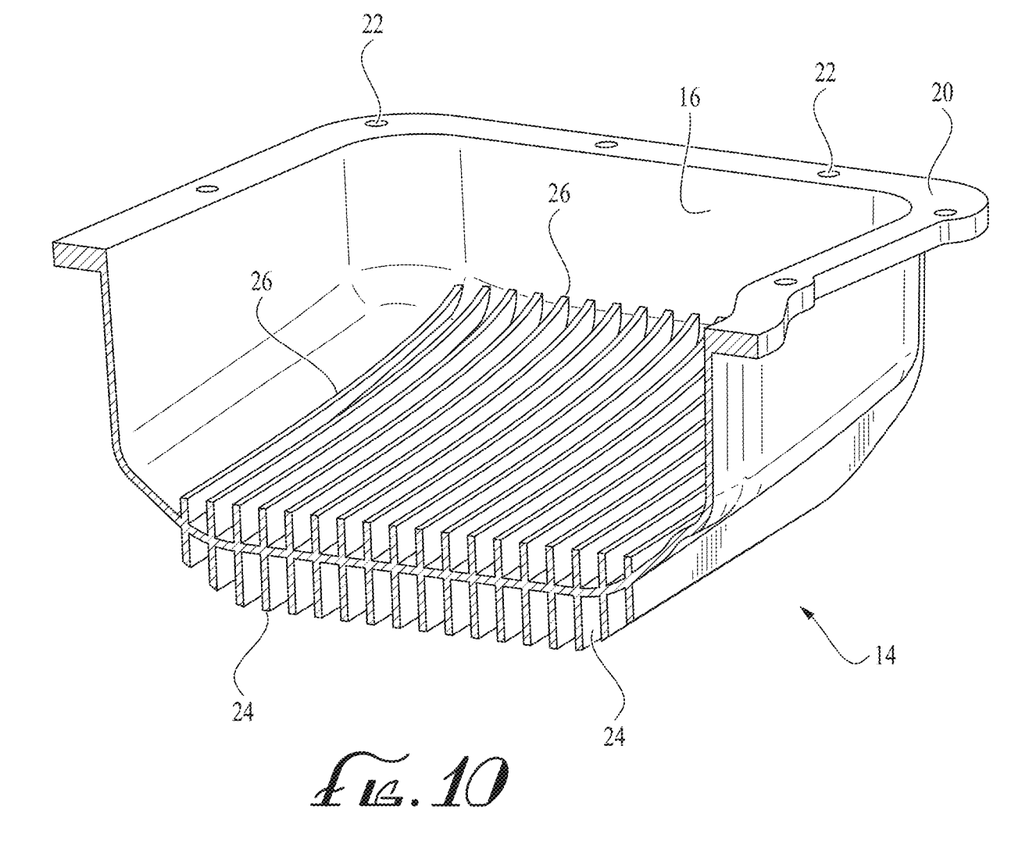
FIG. 10 is a top perspective section view of a vehicle transmission pan taken along line 10-10 of FIG. 8.

As can be seen in FIGS. 8 to 10, the vehicle transmission pan 14 further includes inner cooling fins 26. The inner cooling fins 26 are on the same side of the cover plate 16 as the scaling surface 20. The inner cooling fins 26 provide substantial surface area for heat transfer with a transmission lubricant. As seen in FIG. 10, in a preferred implementation the inner cooling fins 26 are configured to align with outer cooling fins 24. The alignment of inner cooling fins 26 with outer cooling fins 24 provides for optimized heat dissipation from inside the transmission pan 14 to the outside environment.

Figure 1:
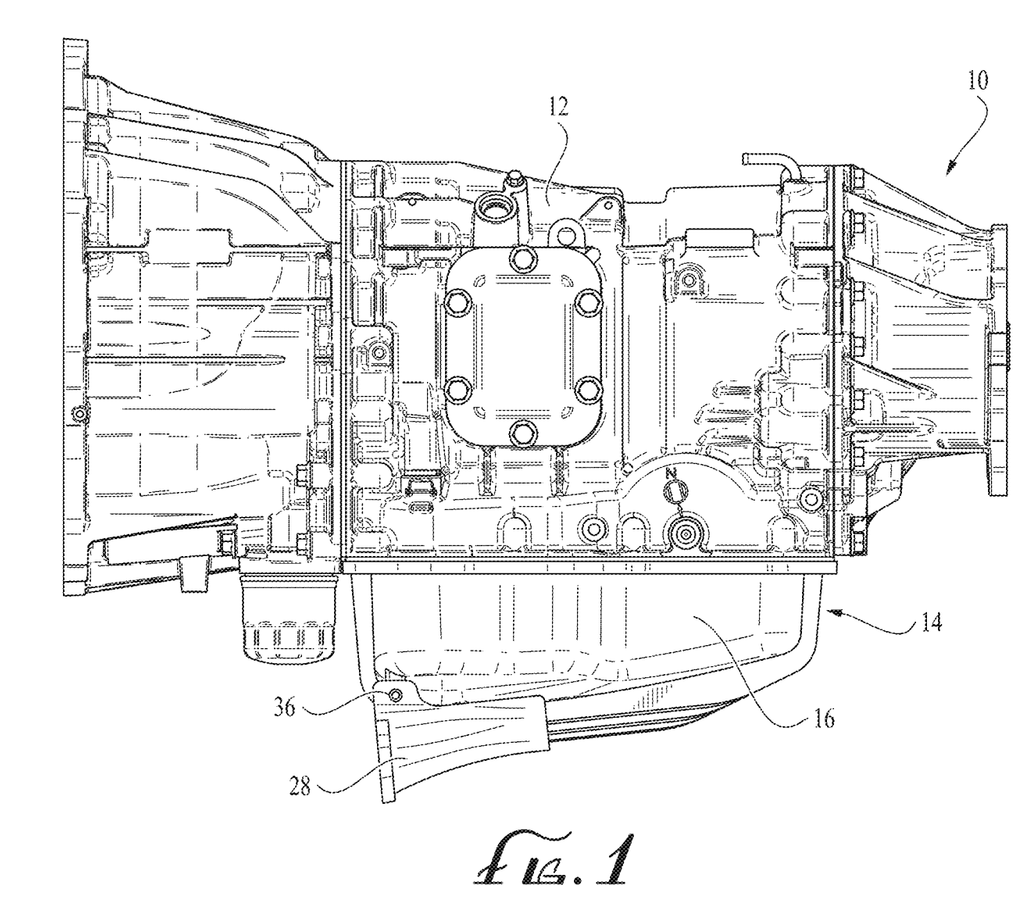
FIG. 1 is a side elevation view of a vehicle transmission with a lubricant pan according to an implementation.
Figure 2:
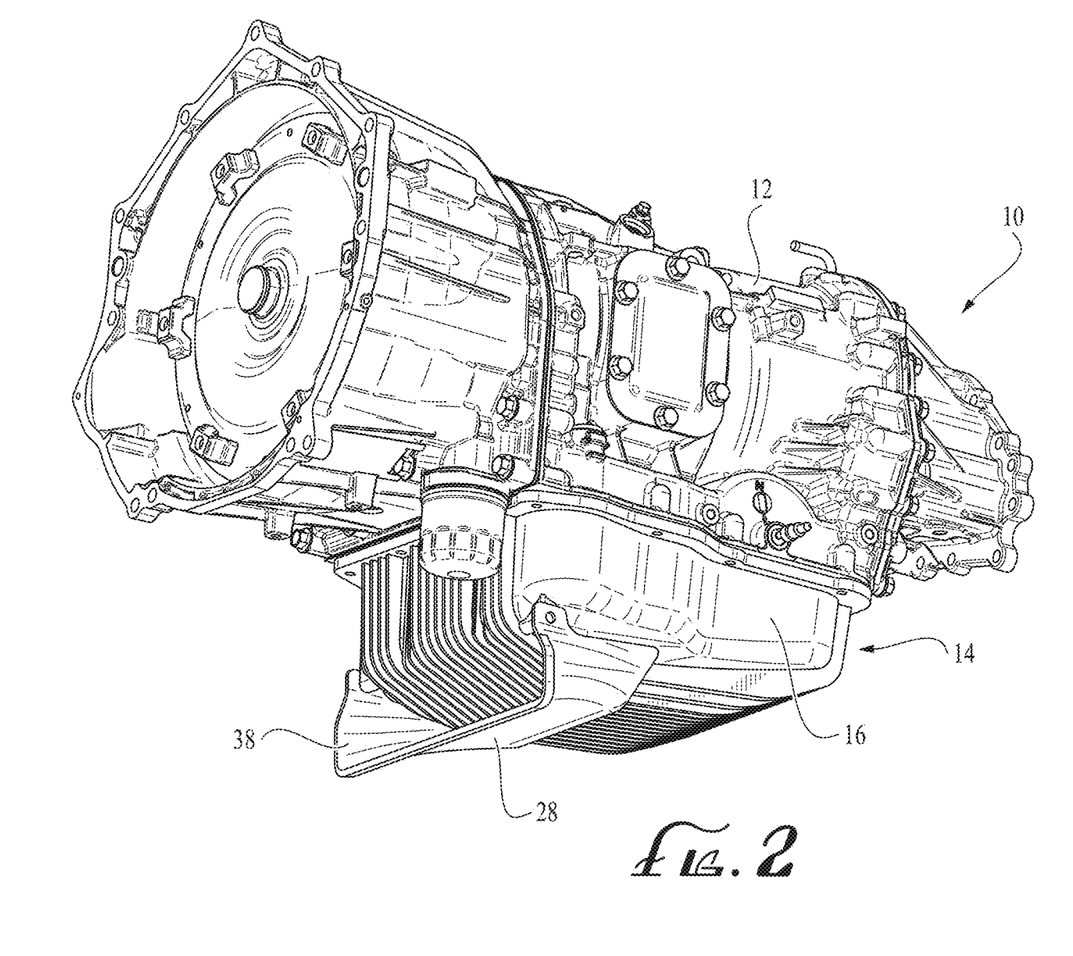
FIG. 2 is a front perspective view of the vehicle transmission of FIG. 1.
Figure 3:
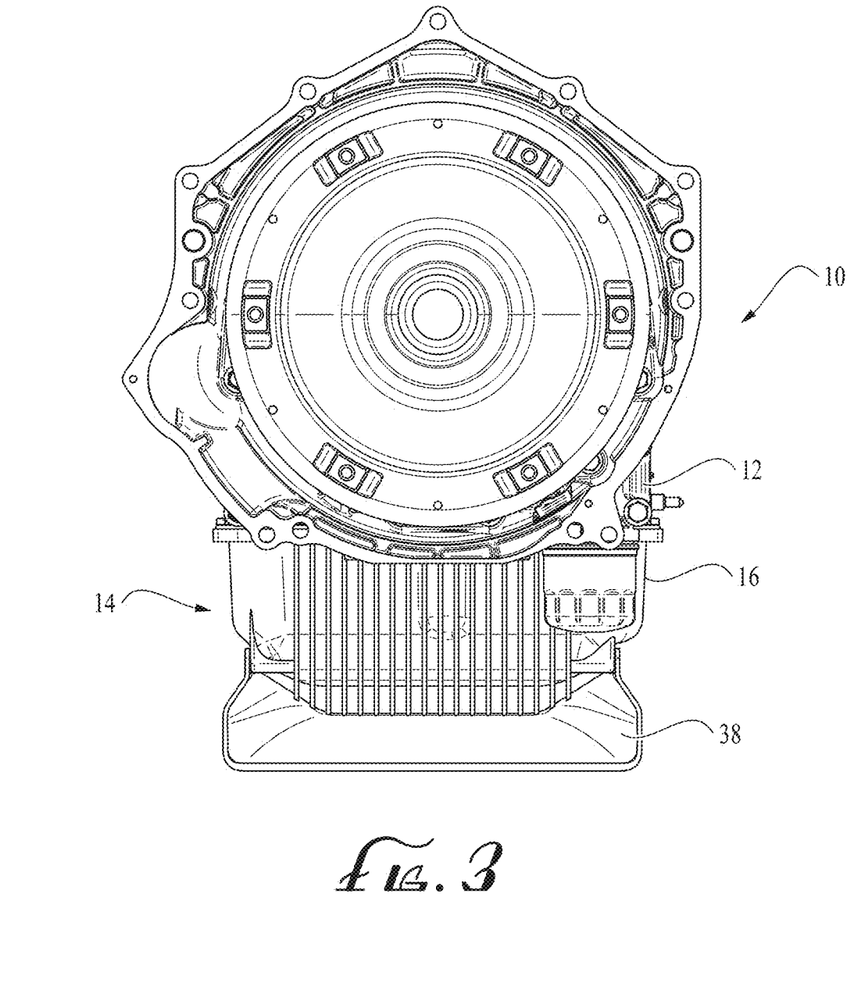
FIG. 3 is a front elevation view of the vehicle transmission of FIG. 1.
Figure 4:
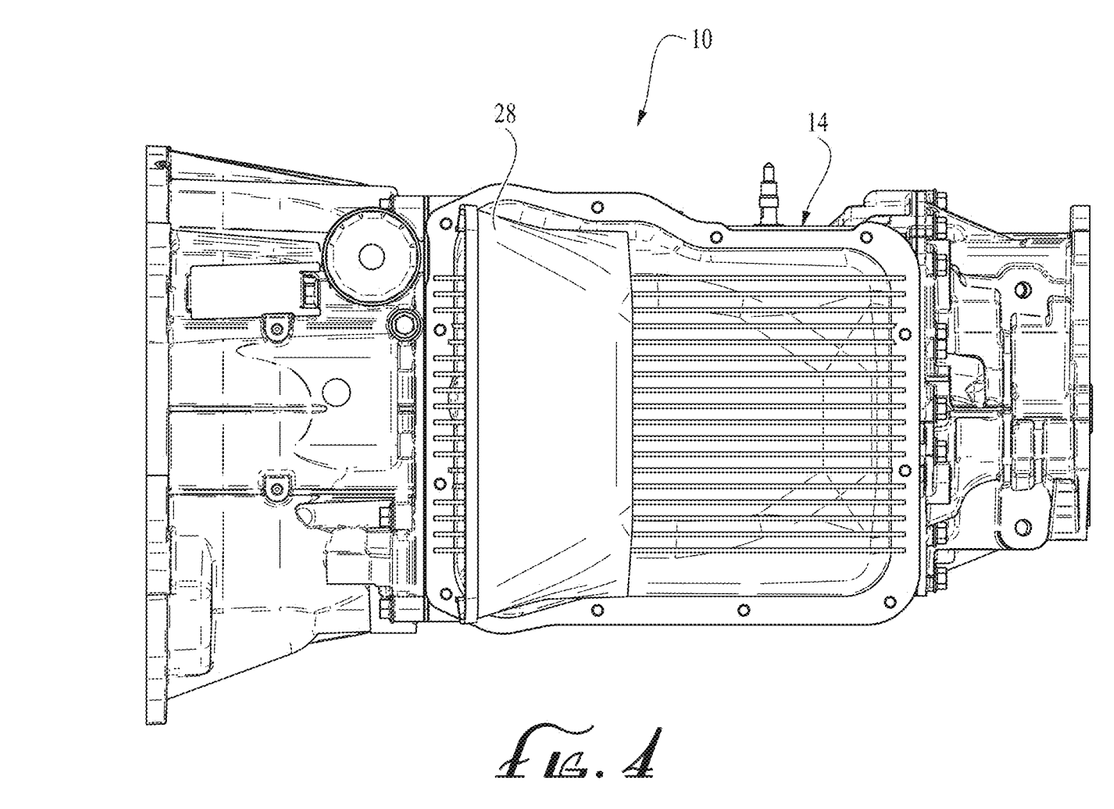
FIG. 4 is a bottom view of the vehicle transmission of FIG. 1.
Figure 5:
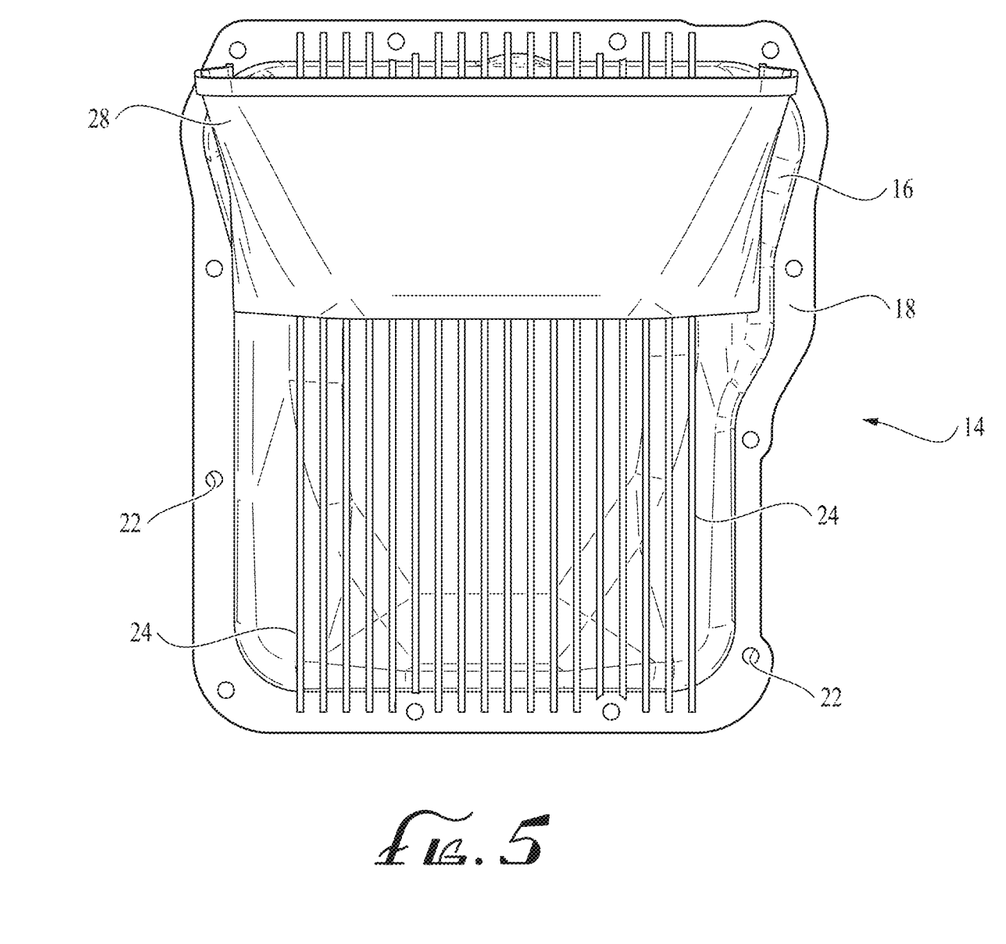
FIG. 5 is a bottom view of a vehicle transmission pan with a scoop according to an implementation.
Figure 6:
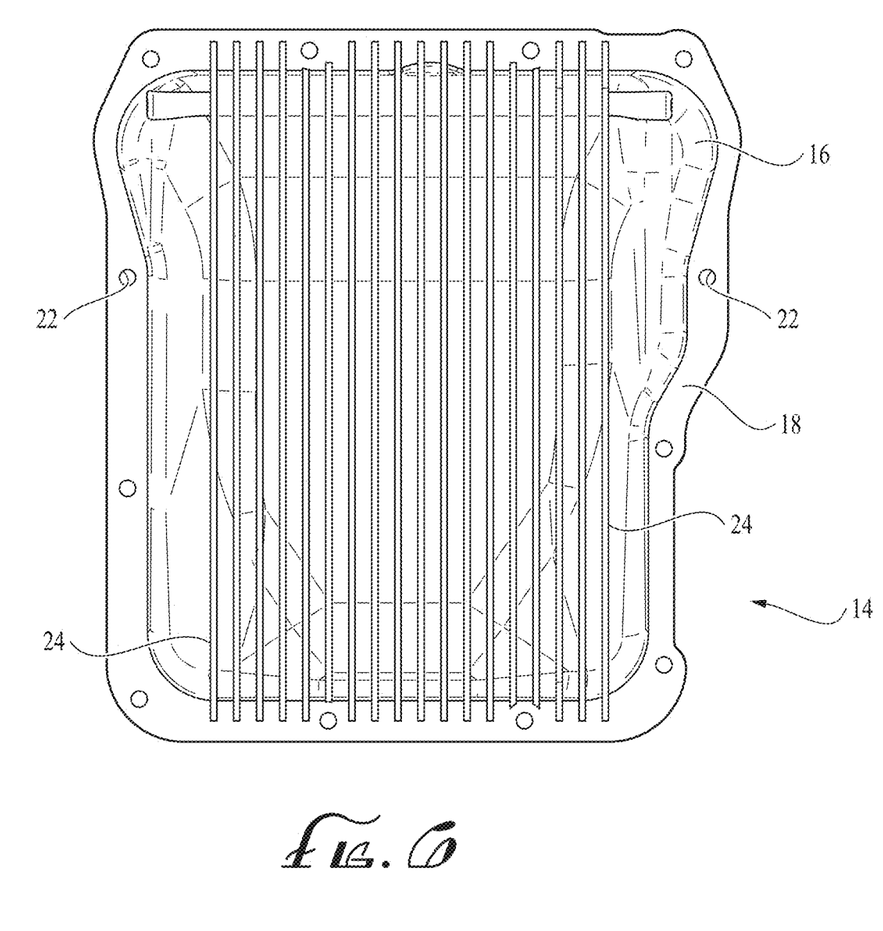
FIG. 6 is a bottom view of the vehicle transmission pan of FIG. 5 with the scoop removed.
Figure 7:
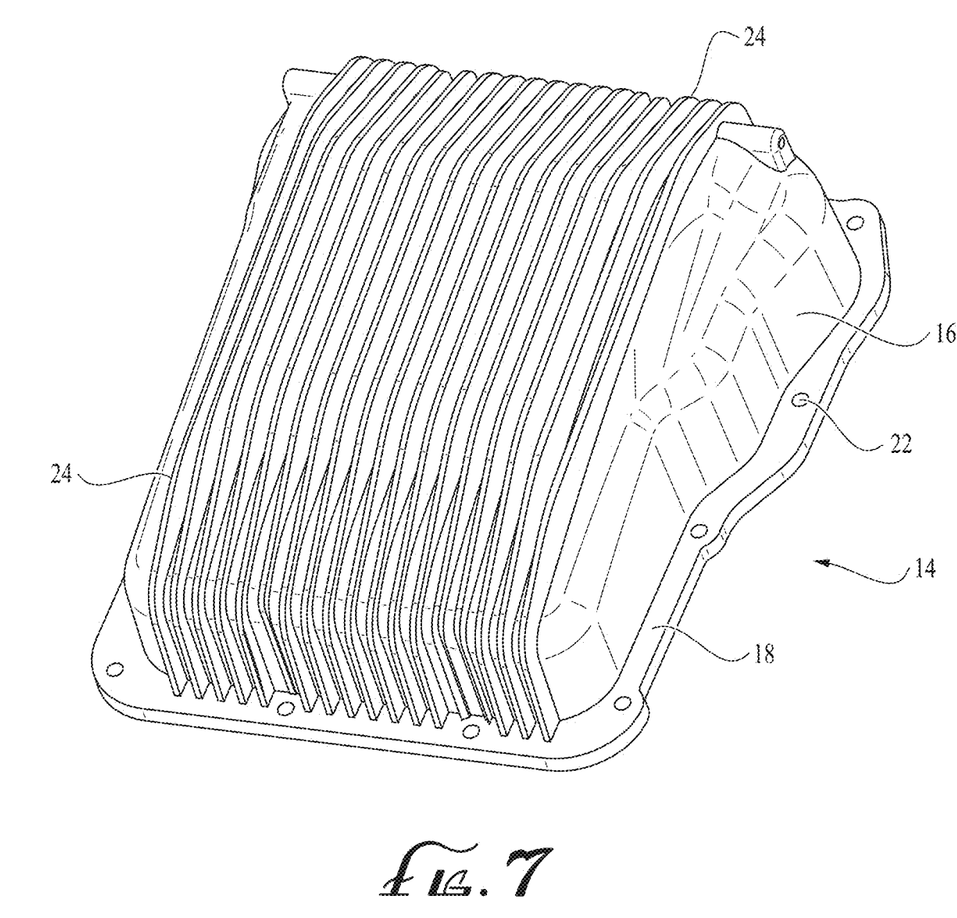
FIG. 7 is a bottom perspective view of a vehicle transmission pan without a scoop according to an implementation.

As seen in FIGS. 2 and 3, the outer cooling fins 24 in the illustrated implementation extend outwardly of the transmission pan 14. In doing so, these cooling fins 24 extend into the air stream flowing past the transmission pan 14. Optionally, inner cooling fins 26 are mounted to sides of the pan facing a passenger side and a driver side of a vehicle. Optionally, outer cooling fins 24 are mounted to sides of the pan facing a passenger side and a driver side of a vehicle.

In an implementation, a scoop 28 is arranged to extend over portions of the outer cooling fins 24. The scoop 28 is displaced from the transmission pan 14 to deflect air onto the outer cooling fins 24 and into passageways between the outer cooling fins. The scoop has an upstream edge 30, a downstream edge 32 and a connecting surface 34 therebetween. The connecting surface 34 may be curved, straight or complex depending on, for example, the shape of the outer cooling fins 24 and anticipated airflow in the proximity of the scoop 28.

The scoop is coupled to the transmission pan 14 by a plurality of connectors 36. The connectors 36 may be for example and without limitation bolts or screws. In an implementation, the scoop is configured to break away from the transmission pan 14 when subjected to a predetermined force to prevent damage to the transmission pan. In additional implementations the connectors 36 are configured to break away and preserve both the scoop and the pan. If the scoop strikes something, the breakaway feature protects the integrity of the pan.

The upstream edge 30 defines an opening 38 facing toward a front of a vehicle to capture air passing proximal to the transmission pan 14. In an implementation the scoop opening 38 is between about 1 inch and about 4 inches high; and preferably between about 2.5 inches and about 3.5 inches high. In an implementation the opening extends across a width of the transmission pan 14. In additional implementations, the opening extends across less than the width of the transmission pan. In additional implementations, the opening extends beyond the width of the transmission pan for increased air flow.

In an implementation the scoop 28 has a plurality of fins which correspond to the outer fins 24 to direct air into the spaces between specific outer fins. The scoop 28 directs air flow to the outer cooling fins 24 extending over the area of the cover plate 16 enclosing the transmission lubricant sump. As the sump contains a pool of liquid, greater heat transfer can occur from the liquid in this area.

Figure 11:
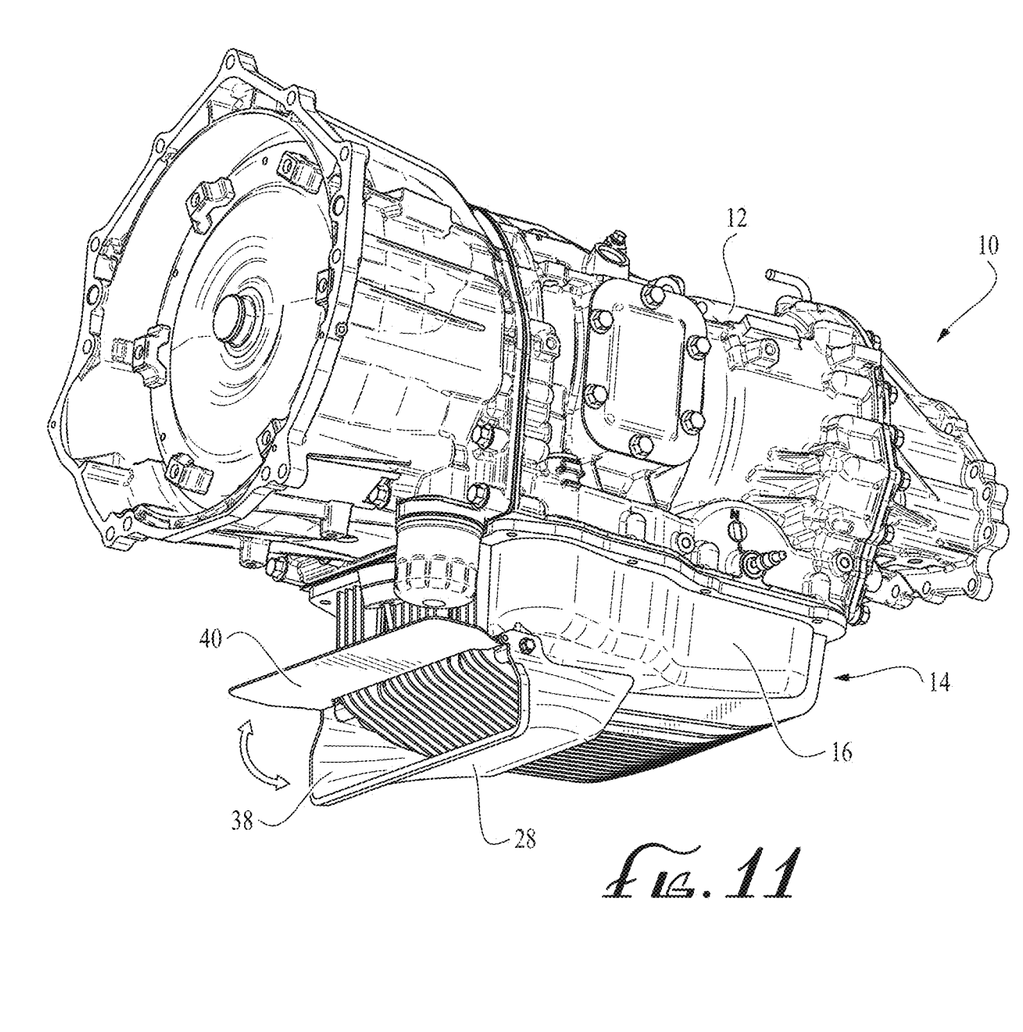
FIG. 11 is a lower perspective view of a vehicle transmission with a lubricant pan with a scoop and a movable baffle shown in an open position according to an implementation.
Figure 12:
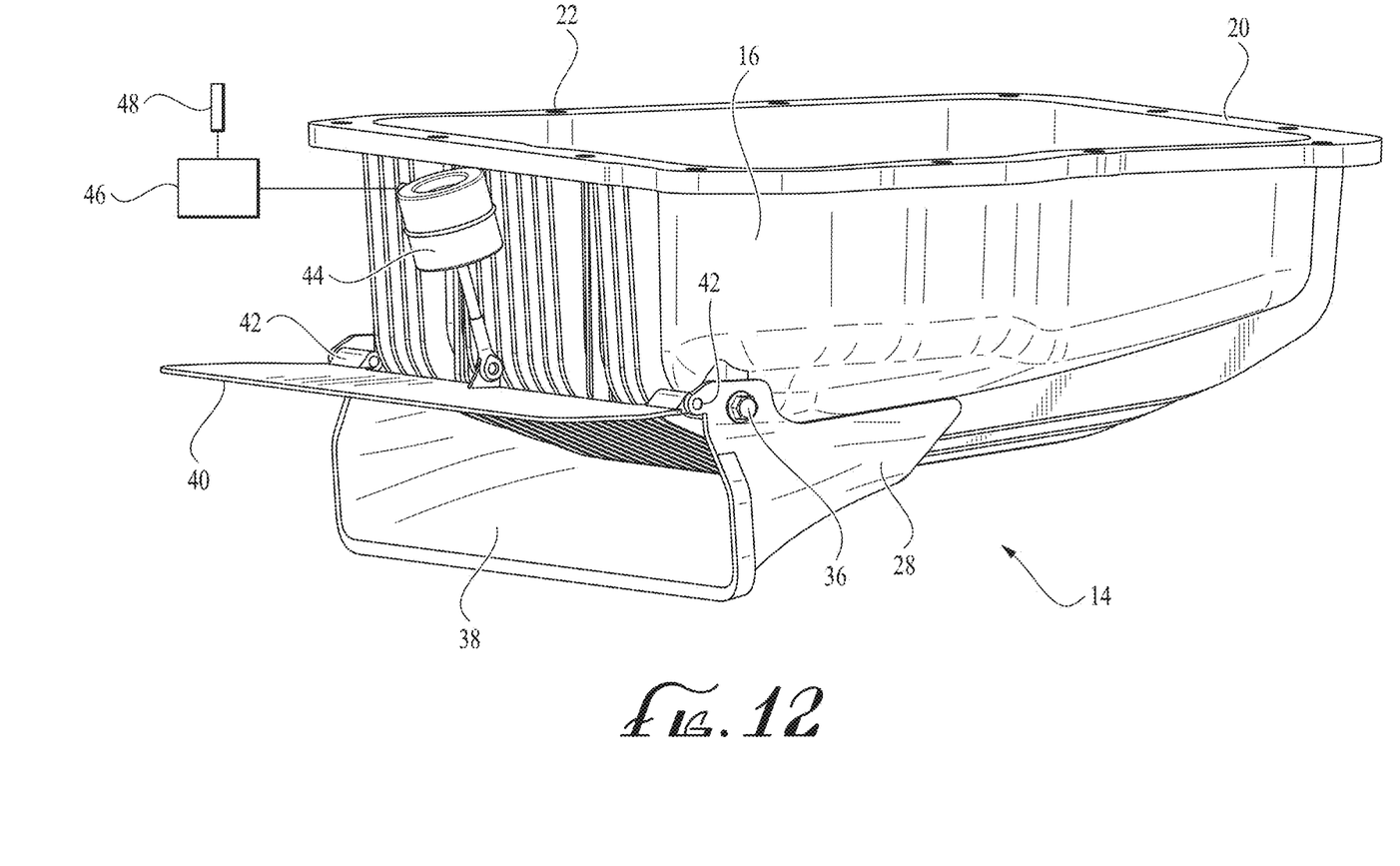
FIG. 12 is a perspective view of a vehicle transmission pan with scoop and a movable baffle shown in an open position according to an implementation.
Figure 13:
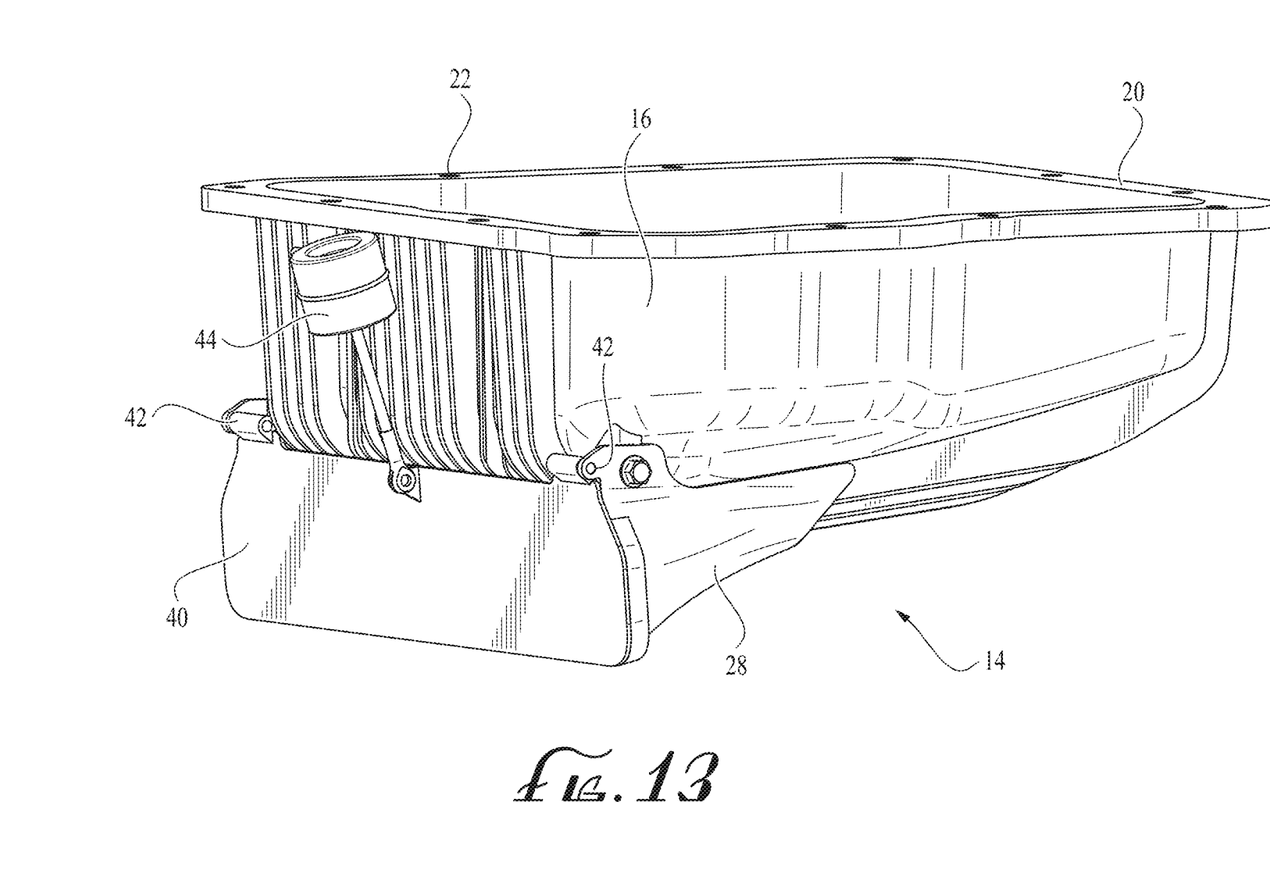
FIG. 13 is a is a perspective view of a vehicle transmission pan with scoop and a movable baffle shown in a closed position according to an implementation.

FIGS. 11 to 13 illustrate an articulated baffle 40. The baffle 40 is pivotally mounted through a pivot 42 fixed to the scoop 28 or transmission pan 14 to rotate relative thereto to selectively cover the scoop opening 38. The baffle 40 may reduce or close air flow to the scoop 28 to reduce cooling of the transmission lubricant, which may be desirable for example, when a vehicle is first operated or when a vehicle is operating in very cold conditions.

A baffle control system is preferably employed to control the baffle 40. In an implementation, the baffle 40 is configured to be normally open or normally closed by a spring bias. An actuator 44, which in an implementation is coupled to the baffle 40, actively works against the spring bias to articulate the baffle 40. In an implementation, the baffle 40 is biased toward an open position and the actuator 44 is energized to close the baffle 40. The actuator 44 may be, for example, a pneumatic piston actuated by either increased pressure over or reduced pressure below ambient. A solenoid or step motor may alternatively be used. The control may be binary or modulated.

A controller 46 is used to energize the actuator 44. The controller 46 may be a simple thermostat or CPU, either of which is configured to be responsive to temperature input. Other inputs such as elapsed time, engine start up and drive initiation may also be used to establish a profile of operation. Input may be independently controlled or be part of an engine control system. A temperature sensor 48 is used to generate temperature input. The sensor 48 may be located in ambient conditions or in transmission lubricant within the transmission pan 14. It is possible to create a complex profile of operation based on multiple temperatures and time, and/or other input parameters.

Accordingly, an improved vehicle transmission pan has been disclosed. While implementations and applications of this invention have been shown and described, it would be apparent to those skilled in the art that many more modifications are possible without departing from the inventive concepts herein. The invention, therefore is not to be restricted except in the spirit of the appended claims.

Any element in a claim that does not explicitly state "means" for performing a specified function or "step" for performing a specified function, should not be interpreted as a "means" or "step" clause as specified in 35 U.S.C. § 112.

What is claimed is:

1. A pan for a vehicle transmission having a transmission lubricant sump, comprising:
   a mounting periphery about the pan attachable to the transmission at a first side of the pan, the pan including an area closing the transmission lubricant sump, wherein the mounting periphery is adapted to fluidly seal the pan to the transmission to prevent transmission lubricant from escaping the sump;
   inner cooling fins on the first side of the pan, the inner cooling fins configured for contact with lubricant in the lubricant sump; and
   outer cooling fins on a second side of the pan, the outer cooling fins extending over the pan area closing the transmission lubricant sump and at least a portion of said outer cooling fins being arranged and exposed to receive direct contact with air passing beneath the vehicle as the vehicle is moving forward;
   wherein at least some of the inner cooling fins and the outer cooling fins are aligned to optimize heat transfer from the inner cooling fins to the outer cooling fins; and
   wherein adjacent inner cooling fins define one or more elongate spaces that are unobstructed from one end of the transmission lubrication sump to an opposite end of the transmission lubrication sump to permit transmission lubricant to move the full length of the pan, thereby facilitating heat transfer from the transmission lubricant in the elongate spaces, through the inner cooling fins, and to the outer cooling fins;
   an air scoop coupled to the pan at one or more mounting locations;
   wherein the air scoop comprises an upstream edge, a downstream edge, and a connecting surface therebetween;
   wherein the upstream edge defines an opening facing toward a front of the vehicle; and
   wherein a width of the opening gradually increases with distance away from the transmission.

2. The vehicle transmission pan of claim 1 wherein the opening has a height of between about 1 inches and about 4 inches.

3. The vehicle transmission pan of claim 1 wherein the opening has a height of between about 2.5 inches and about 3.5 inches.

4. The vehicle transmission pan of claim 1 wherein the air scoop is coupled to the transmission pan with a plurality of connectors; and wherein the scoop is configured to break away when subjected to a predetermined force to prevent damage to the transmission pan.

5. The vehicle transmission pan of claim 1 further comprising:
   a baffle pivotally mounted relative to the opening to selectively close the opening to removably block airflow through the scoop.

6. The vehicle transmission pan of claim 5 further comprising:
   a baffle control system further comprising:
      a controller;
      a sensor coupled to the controller, the sensor being configured to measure at least one of ambient air temperature outwardly of the transmission pan and transmission lubricant temperature; and
      an actuator coupled to the pivotally mounted baffle and to the controller;
   wherein the controller drives the actuator responsive to the measured temperature of the sensor.

7. The vehicle transmission pan of claim 6 wherein the controller comprises a binary thermostat.

8. The vehicle transmission pan of claim 6 wherein the controller is configured for modulated control of the actuator.

9. A vehicle transmission pan comprising:
   a cover plate;
   a mounting periphery about the cover plate attachable to a vehicle transmission at a first side of the cover plate, the cover plate including an area closing the transmission lubricant sump;
   inner cooling fins on the first side of the cover plate, the inner cooling fins configured for contact with lubricant in the lubricant sump;
   outer cooling fins on a second side of the cover plate, the outer cooling fins extending over the cover plate area closing the transmission lubricant sump and configured for contact with air; and
   an air scoop coupled to the cover plate at at least one mounting location, the air scoop extending over a portion of the outer cooling fins and configured to direct air to the outer cooling fins;
   wherein at least a portion of the inner cooling fins and the outer cooling fins are aligned to optimize heat transfer from the inner cooling fins to the outer cooling fins; and
   wherein the air scoop comprises an upstream edge, an opening, a downstream edge, and a connecting surface therebetween; and wherein the opening is shaped and arranged with the cover plate to direct air directly into the second side of the cover plate;

wherein a width of the opening at the upstream edge gradually increases away from the at least one mounting location; and wherein the connecting surface is curved such that a gap between the connecting surface and the outer cooling fins gradually decreases until the downstream edge of the air scoop is at close proximity or touches the outer cooling fins across the width of the second side of the cover plate.

10. The vehicle transmission pan of claim 9, wherein the opening gradually decreases in width towards the rear of the vehicle.

11. The vehicle transmission pan of claim 10 wherein the opening has a height of between about 1 inch and about 4 inches.

12. The vehicle transmission pan of claim 10 wherein the opening has a height of between about 2.5 inches and about 3.5 inches.

13. The vehicle transmission pan of claim 9 wherein the opening at the upstream edge extends beyond the width of the cover plate.

14. The vehicle transmission pan of claim 9 wherein the air scoop is coupled to the cover plate with a plurality of connectors; and wherein the connectors are configured to break away when subjected to a predetermined force to prevent damage to the air scoop or the cover plate.

15. The vehicle transmission pan of claim 9 further comprising:
a baffle pivotally mounted relative to the opening to selectively close the opening to removably block airflow through the scoop.

16. The vehicle transmission pan of claim 15 further comprising:
a baffle control system further comprising:
a controller;
a sensor coupled to the controller, the sensor being configured to measure at least one of ambient air temperature outwardly of the transmission pan and transmission lubricant temperature; and
an actuator coupled to the pivotally mounted baffle and to the controller;
wherein the controller drives the actuator responsive to the measured temperature of the sensor.

17. The vehicle transmission pan of claim 16 wherein the controller comprises a binary thermostat.

18. The vehicle transmission pan of claim 16 wherein the controller is configured for modulated control of the actuator.

19. A vehicle transmission pan comprising:
a cover plate;
a mounting periphery about the cover plate attachable to a vehicle transmission at a first side of the cover plate by a first plurality of vertically-oriented connectors, the cover plate including an area closing the transmission lubricant sump;
inner cooling fins on the first side of the cover plate, the inner cooling fins configured for contact with lubricant in the lubricant sump;
outer cooling fins on a second side of the cover plate, the outer cooling fins extending over the cover plate area closing the transmission lubricant sump and configured for contact with air; and
an air scoop shaped and arranged with the cover plate to define an upstream edge, a downstream edge, a connecting surface therebetween, and an entrance funneling air directly against the second side of the pan, and extending over a portion of the outer cooling fins and configured to direct air to the outer cooling fins;
wherein at least a portion of the inner cooling fins and the outer cooling fins are aligned to optimize heat transfer from the inner cooling fins to the outer cooling fins; and
wherein the air scoop is coupled to the cover plate by a second plurality of laterally-oriented connectors, and adapted to break away when subjected to a predetermined force to prevent damage to the cover plate and the mounting periphery; and
wherein a width of the entrance at the upstream edge gradually increases with distance away from the mounting periphery.

20. The vehicle transmission pan of claim 19,
wherein the connecting surface is curved such that a gap between the connecting surface and the outer cooling fins gradually decreases until the downstream edge of the air scoop is at close proximity or touches the outer cooling fins across the width of the second side of the cover plate.

* * * * *